（12）United States Patent
Reddy et al.

(10) Patent No.: US 8,564,976 B2
(45) Date of Patent: Oct. 22, 2013

(54) INTERLEAVED LLC POWER CONVERTERS AND METHOD OF MANUFACTURE THEREOF

(75) Inventors: Raghothama Reddy, Murphy, TX (US); Robert Catalano, Mesquite, TX (US); Roger Grandchampt, Dallas, TX (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 12/273,542

(22) Filed: Nov. 19, 2008

(65) Prior Publication Data

US 2010/0123450 A1   May 20, 2010

(51) Int. Cl.
H02M 3/335 (2006.01)
(52) U.S. Cl.
USPC .................. 363/21.02; 323/247; 323/355
(58) Field of Classification Search
USPC ........... 363/21.02, 21.03, 21.04, 65; 323/247, 323/271, 272, 305, 328, 355
See application file for complete search history.

(56) References Cited

U.S. PATENT DOCUMENTS

| | | | | |
|---|---|---|---|---|
| 5,162,982 | A * | 11/1992 | Mentler | 363/26 |
| 5,946,205 | A * | 8/1999 | Kawakami et al. | 363/65 |
| 5,946,206 | A * | 8/1999 | Shimizu et al. | 363/65 |
| 7,271,695 | B2 | 9/2007 | Wadlington et al. | |
| 2004/0145928 | A1* | 7/2004 | Takada | 363/95 |
| 2005/0063115 | A1* | 3/2005 | Nayar et al. | 361/82 |
| 2005/0152100 | A1* | 7/2005 | Rodriguez et al. | 361/605 |
| 2006/0126364 | A1* | 6/2006 | Yasumura | 363/16 |
| 2007/0086224 | A1* | 4/2007 | Phadke et al. | 363/65 |
| 2007/0114952 | A1* | 5/2007 | Yang | 315/307 |
| 2007/0217235 | A1* | 9/2007 | Quazi | 363/89 |
| 2008/0247210 | A1* | 10/2008 | Hu | 363/131 |
| 2009/0167285 | A1* | 7/2009 | Huang et al. | 323/363 |
| 2010/0033993 | A1* | 2/2010 | Kim et al. | 363/17 |
| 2010/0097010 | A1* | 4/2010 | Chen et al. | 315/297 |

FOREIGN PATENT DOCUMENTS

| | | |
|---|---|---|
| CN | 1521930 A | 8/2004 |
| JP | 2006314171 A | 11/2006 |
| WO | 2008004647 A1 | 1/2008 |

OTHER PUBLICATIONS

Basso; "A Simple DC SPICE Model for the LLC Converter;" Semiconductor Components Industries, LLC, 2006; Publication Order No. AND8255/D; Oct. 2006—Rev. 2; http://onsemi.com; pp. 1-12.
Roman Stuler; And8257/D; Implementing a Medium Power AC-DC Converter with the NCP1395; http://onsemi.com; Semiconductor Components Industries, LLC, Feb. 2006 Rev. 0; 19 pages.
Christophe Basso; And8255/D; A Simple DC Sp[ice Model for the LLC Converter; http://onsemi.com; Semiconductor Components Industries, LLC; Oct. 2006 Rev.2; 12 pages.
Jin Ke, Ruan Xin-bo, "Control Strategy for Zero-Voltage-Switching Multi-Resonant Three-Level Converters", Proceedings of the CSEE Chin. Soc. For Elec. Eng., 2004, pp. 29-33, vol. 24, No. 12, Jiangsu Province, China.

\* cited by examiner

*Primary Examiner* — Adolf Berhane
*Assistant Examiner* — Gustavo Rosario Benitez
(74) *Attorney, Agent, or Firm* — Dolly Wu; General Electric Company

(57) ABSTRACT

A system is provided having a first LLC power converter and a second LLC power converter. The first LLC power converter comprises a first LLC voltage source. The second LLC power converter also comprises a second LLC voltage source. The first LLC power converter also comprises a first resonant inductor, a first magnetic inductor, and a first resonant capacitor coupled to the first voltage source of the first LLC power converter. The second LLC power converter comprises a second resonant inductor, a second magnetic inductor, and a second resonant capacitor coupled to the second voltage source of the second LLC power converter. The first LLC power converter and the second LLC power converter are both magnetically couplable to a common load. A resonance of the first LLC power converter substantially matches a resonance of the second LLC power converter.

27 Claims, 5 Drawing Sheets

CENTER TAP CURRENTS

INTERLEAVED HALF BRIDGE LLC CLAMPED DIODE
400Vin/12Vout/132A @ 200KHz
584% CONDUCTION LOSS VARIATION

CENTER TAP CURRENTS

INTERLEAVED HALF BRIDGE LLC CLAMPED DIODE
400Vin/12Vout/132A @ 200KHz
6.1% CONDUCTION LOSS VARIATION
L1 = 1.01 Lr, L2 = .99 Lr

INTERLEAVED LLC POWER CONVERTERS AND METHOD OF MANUFACTURE THEREOF

TECHNICAL FIELD OF THE INVENTION

The invention is directed, in general, to an inductor-inductor-capacitor ("LLC") power converter, and more specifically, to a plurality of interleaved LLC power converters.

BACKGROUND OF THE INVENTION

LLC power converters are an ever-increasingly important part of power conversion systems. LLC power converters have a number of advantages when compared to other power converters. These advantages can include zero voltage switching when cycling between a no-load to a full load on primary switches, lower electromagnetic emissions. LLC power converters can also operate at higher switching frequencies than many other forms of power converters, which can in turn lower the size of magnetics in LLC power converters.

However, disadvantages also arise when employing LLC power converters. One disadvantage can include a high output ripple current. This is especially problematic when attempting to interleave LLC power converters. For example, FIG. 1 shows that the output of interleaved LLC power converters can exhibit significant ripple current. The magnitude of the ripple current effectively prevents LLC power converter from being used in many power system topologies, especially when a plurality of LLC power converters are coupled to a common load.

SUMMARY OF THE INVENTION

To address the above-discussed deficiencies of the prior art, the invention provides a system including a first LLC power converter and a second LLC power converter. The first LLC power converter includes a first LLC voltage source. The second LLC power converter includes a second LLC voltage source. The first LLC power converter also includes a first resonant inductor, a first magnetic inductor, and a first resonant capacitor coupled to the first LLC voltage source. The second LLC power converter also includes a second resonant inductor, a second magnetic inductor, and a second resonant capacitor coupled to the second LLC voltage source. The first LLC power converter and the second LLC power converter are both magnetically couplable to a common load. A resonance of the first LLC power converter substantially matches a resonance of the second LLC power converter.

In another aspect, the invention provides a system including a first LLC power converter and a second LLC power converter. The system includes a first LLC voltage source of the first LLC power converter and a second LLC voltage source of the second LLC power converter. The system further includes a first magnetic inductor and a first resonant capacitor of the first LLC power converter coupled to the first LLC voltage source. The system still further includes a second magnetic inductor and a second resonant capacitor coupled to the second LLC voltage source of the second LLC power converter. The system yet further includes a component including a first resonant inductor and a second resonant inductor, wherein the first resonant inductor and the second resonant inductor are substantially matched in inductance. The first resonant inductor is coupled to the first LLC voltage source. The second resonant inductor is coupled to the second LLC voltage source. A resonance of the first LLC is substantially matched to a resonance of the second LLC. The first LLC power converter and the second LLC power converter are both magnetically couplable to a common load.

In yet another aspect, the invention provides a method of manufacturing a first and a second LLC power converter. The method includes selecting a substantially matched set of inductors for use in a first and second LLC power converter, each LLC power converter magnetically couplable to a common load. The method also includes coupling each member of the matched set of inductors into the first and second LLC power converters, respectively. The method further includes determining a first resonance frequency of the first LLC power converter and determining a second resonance frequency of the second LLC power converter. The method still further includes matching substantially a resonant frequency of the first LLC power converter and the second LLC power converter.

The foregoing has outlined preferred and alternative features of the invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

It is recognized that an imbalance in output currents can be a result of a mismatch of resonant frequencies between interleaved LLC power converters. Resonances between the interleaved LLC power converters should therefore be substantially matched. Furthermore, an inductance mismatch of resonant inductors can be a source of significant resonant mismatch between interleaved LLC power converters.

Therefore, substantially matched resonant LLC converters may be employed to reduce or minimize the resonant mismatch. In other embodiments, resonant inductors of interleaved LLC power converters are adjusted to compensate for a resonance mismatch between the interleaved LLC power converters. In some embodiments, the resonant inductors are previously matched in inductance values before being adjusted to compensate for a resonance mismatch between the interleaved LLC power converters.

Figure 2:
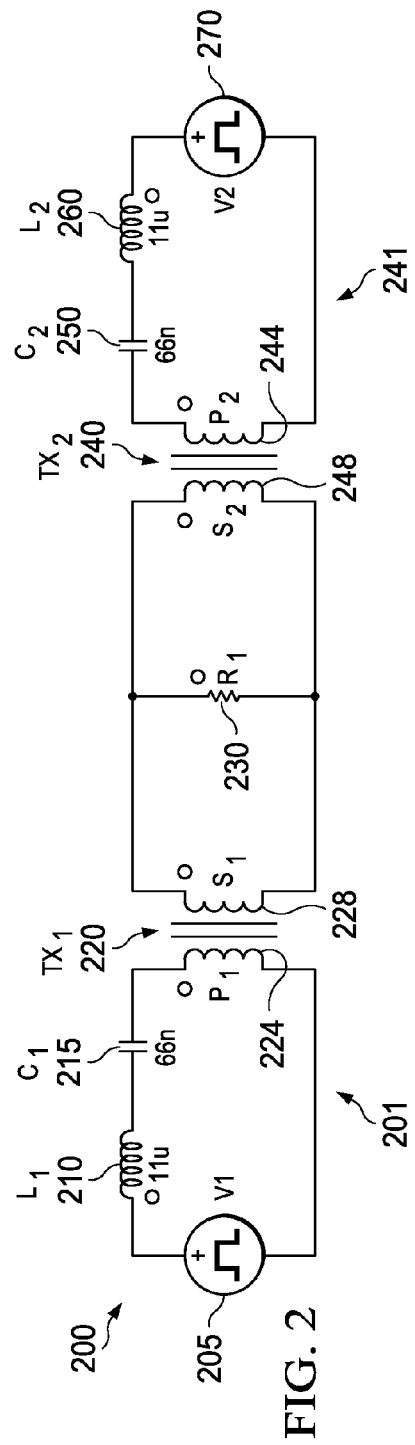
FIG. 2 a block diagram of one embodiment of a system of an interleaving of two LLC power converters constructed according to the principles of the invention.

FIG. 2 is a block diagram of one embodiment of a system 200 of an interleaving of a first LLC power converter 201 and a second LLC power converter 241 constructed according to the principles of the invention.

The converter 201 has an equivalent first Thevenin voltage source 205 for the first LLC power converter 201. The Thevenin voltage source 205 acts as an LLC power converter voltage source. A generated square wave voltage output can be represented by the Thevenin voltage source 205. The generated square wave output can be measured across a junction of two Metal Oxide Semiconductor Field Effect Transistors ("MOSFETs") of a bridge circuit that can be represented by the Thevenin voltage source 205.

For more information on the Thevenin voltage source 205, employable in the system 200, see, Stuler, AND8257/D "Implementing a Medium Power AC-DC Converter with the NCP1395," Semiconductor Components Industries, LLC, February 2006, Rev. 0, incorporated herein by reference in its entirety, and, Basso, AND8255/D "A Simple DC SPICE Model for the LLC Converter," Semiconductor Components Industries, LLC, October 2006—Rev. 2, also incorporated herein by reference in its entirety.

Coupled to the first voltage source 205 is a first resonant inductor 210. Coupled to the first resonant inductor 210 is a first resonant capacitor 215. Coupled to the first resonant capacitor 215 is a first magnetic inductor 224 of a first transformer 220. The first magnetic inductor 224 is a primary winding of the first transformer 220. The first magnetic inductor 224 is also coupled to the voltage source 205.

The second LLC power converter 241 has an equivalent second Thevenin voltage source 270. A generated square wave voltage output can be represented by the Thevenin voltage source 270. The generated square wave output can be measured across a junction of two MOSFETs of a bridge circuit that can be represented by the Thevenin voltage source 270. Coupled to the second voltage source 270 is a second resonant inductor 260. Coupled to the second resonant inductor 260 is a second resonant capacitor 250. Coupled to the second resonant capacitor 250 is a first magnetic inductor 244 of a second transformer 240. The first magnetic inductor 244 is a primary winding of the second transformer 240.

The first transformer 220 has a secondary winding 228. The secondary winding 228 is coupled in parallel to a common load $R_1$ 230. The second transformer 240 has a secondary winding 248. The secondary winding 248 is also coupled in parallel to a common load $R_1$ 230. The common load $R_1$ 230 is magnetically couplable to the first and second LLC power converters 201, 241.

In the system 200, in one embodiment, the resonant inductors 210, 260 are matched inductors. In one embodiment, a matched inductor is when the inductors have a variation of inductance of less than 2% from each other. In some embodiments, a resonance to be matched in the LLC power converter 201, 241 includes:

$$Fs = \frac{1}{\{2\pi\sqrt{(Ls*Cs)}\}}$$

In some further embodiments, a resonance to be matched in the LLC power converter 201, 241, includes:

$$Fm = \frac{1}{\{2\pi\sqrt{\{(Ls+Lm)*Cs\}}\}}$$

Therefore, having resonant inductors ("$L_s$") that are substantially matched allows for a better matching of resonant frequencies of the LLC power converter 201 and the LLC power converter 241, which in turn allows for a smaller variation of output current from the LLC power converters 201, 241. A smaller variation of output current can therefore allow for an effective interleaving of LLC power converters 201, 241.

In the system 200, in some embodiments, the resonant inductors 210, 260 also are to be matched for an interleaving of LLC power converters 201, 241 to occur. Although a matching of resonant capacitors could be fairly straightforward in conventional LLC power controller systems, conventional systems have generally had resonant inductors with significant inductive variation, in some circumstances as high as 8.0% or more. It is recognized that this created difficulties for an interleaving of LLC power converters. In some embodiments, through advantageously employing matched resonant inductors 210, 260, the system 200 can interleave LLC power converters 201, 241, through allowing the interleaved LLC power converters 201, 241 to be operating at a closer resonance.

In some further embodiments, at least one of the resonant inductors 210, 260, which can be matched resonant inductors, is adjusted to substantially match a resonance between the LLC power converter 201 and the LLC power converter 241. This adjustment can be used to compensate for a resonance mismatch due to such factors as an additional magnetic "leakage inductance" in the primary sides (i.e., the magnetic inductors 224, 244) of the first and second transformers 220, 240, thereby altering a resonance value. In some further embodiments, the transformers 220, 240 may themselves have an additional resonant inductance that can be adjusted for by adjusting an inductance value of the first and second resonant inductors 210, 260. A value of 11 microHenries for the resonant inductors 210, 250, and a value of 66 nanoFarads for the resonant capacitors 215, 260 are both exemplary values only, and other values for the resonant inductors 210, 250 and the resonant capacitors 215, 260 are within the scope of the invention.

In the system 200, an interleaving of LLC power converters 201, 241 can occur due to a lessening or minimizing of variation of a ripple current between an output current of the LLC power converters 201, 241. Therefore, the system 200 can support a higher overall output current, such as through the common load $R_1$ 230, through the interleaving of matched LLC power converters, than was generally available with conventional LLC power converters.

Figure 1:
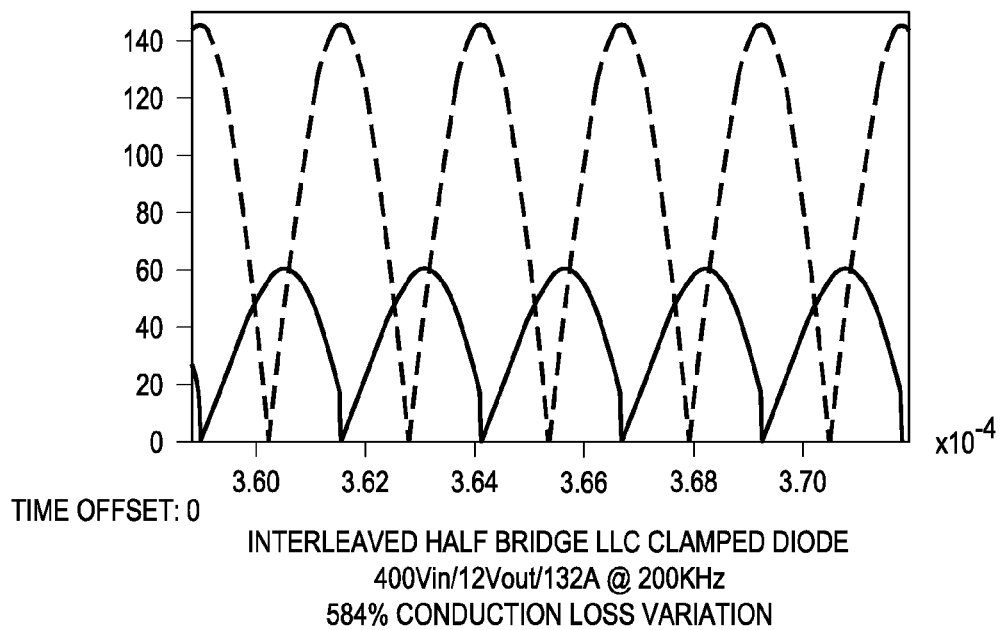
FIG. 1 illustrates an example of a graph of a ripple output of a prior art LLC power converter.
Figure 3:
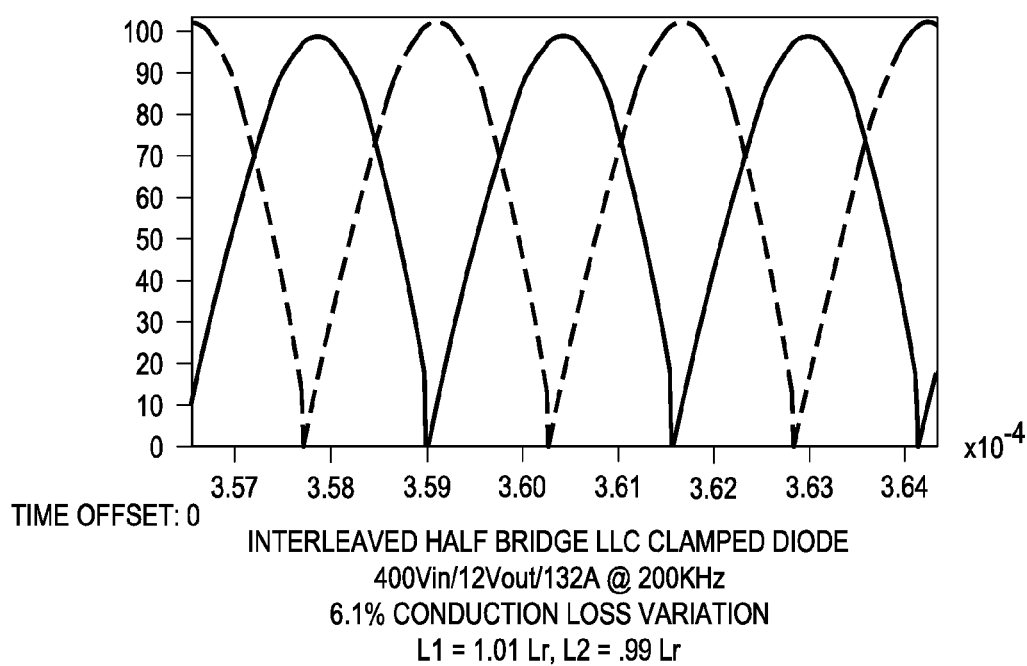
FIG. 3 illustrates an example of a graph of an output current of two interleaved LLC power converters constructed according to the principles of the invention.

FIG. 3 illustrates an example of a graph of an output current of two interleaved LLC power converters 201, 241 constructed according to the principles of the invention. As is illustrated, the variation in current ripple is significantly reduced through an employment of the first and second LLC power converters 101, 141 with substantially matched resonant inductors 210, 260. The values of $L_1$ 210 and $L_2$ 260 are 1.01 and 0.99 of $L_r$, $L_r$ being a given value of a resonant inductance from which these inductance values vary.

As is illustrated in FIG. 3, an interleaving of LLC power converters 201, 241 having substantially matched resonances can be advantageous. This advantage can be that the current characteristics of the LLC power converter current waveforms are substantially similar, thereby allowing for an interleaving of the LLC power converters 201, 241. Generally, the interleaving of LLC power converters 201, 241 can lower a variation of an aggregate output ripple current through a load in proportion to the number of interleaved LLC power converters 201, 241. The output waveforms are similar to each other, allowing an interleaving of these waveforms to occur. The similar waveforms are out of phase with each other by a fixed phase, thereby contributing to a lessening of an average variation of current output.

Figure 4:
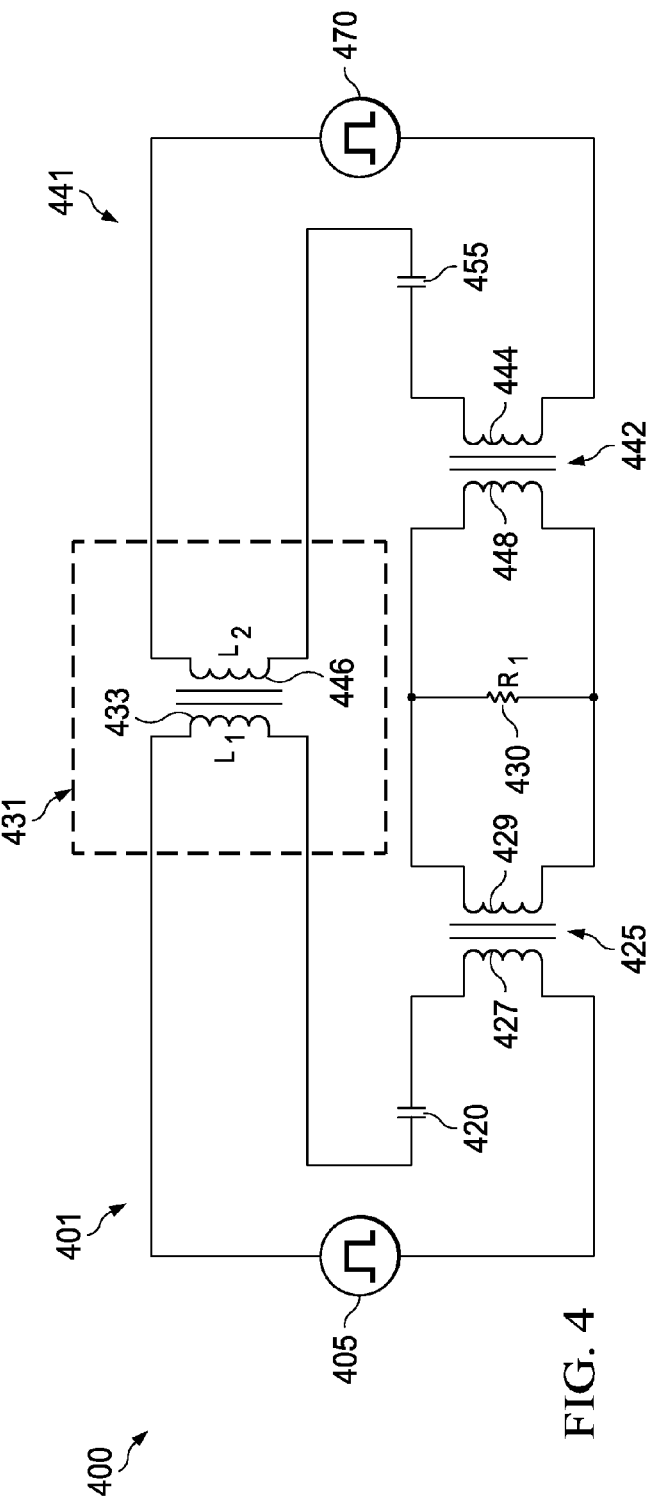
FIG. 4 is a block diagram of one embodiment of a system including a matched pair of resonant inductors of two interleaved LLC power converters constructed according to the principles of the invention.

FIG. 4 is a block diagram of one embodiment of a system 400 including a matched pair of resonant inductors of two interleaved LLC power converters 401, 441 constructed according to the principles of the invention. Generally, the system 400 includes an integral component 431. The integral component 431 includes a first resonant inductor 433 and a second resonant inductor 446. The first resonant inductor 433 and the second resonant inductor 446 are coupled in the first LLC power converter 401 and the second LLC power converter 441, respectively.

Generally, when the interleaved first and second LLC power converters 401, 441 are manufactured, the integral component 431 is inserted to help aid in a matching of the first and second resonant inductors 433, 446, thereby allowing for a closer resonant frequency match between the first and second LLC power converters 401, 441. Employment of the integral component 431 having matched inductors 443, 446 is generally advantageous during the manufacturing process, as the manufacturer of the system 400 does not have to match the resonant inductors 433, 446, thereby avoiding problems with overstock, and so on.

The first LLC power converter 401 has an equivalent first Thevenin voltage source 405. Coupled to the first voltage source 405 is the first resonant inductor 433. The first resonant inductor 433 is part of the integral component 431. Coupled to the resonant inductor 433 is a resonant capacitor 420. Coupled to the resonant capacitor 420 is a first magnetic inductor 427 of a first transformer 425. The first magnetic inductor 427 is a primary winding of the first transformer 425. The first magnetic inductor 427 is also coupled to the voltage source 405.

The second LLC power converter 441 has an equivalent second Thevenin voltage source 470 for the LLC power converter 441. Coupled to the second voltage source 470 is the second resonant inductor 410. The second resonant inductor 446 is also part of the integral component 431. Coupled to the second resonant inductor 446 is a second resonant capacitor 455. Coupled to the resonant capacitor 455 is a second magnetic inductor 444 of a second transformer 442. The second magnetic inductor 444 is a primary winding of the second transformer 442.

The first transformer 425 has a secondary winding 429. The secondary winding 429 is coupled in parallel to a common load $R_1$ 430. The second transformer 442 has a secondary winding 448. The secondary winding 448 is also coupled in parallel to the common load $R_1$ 430. The common load $R_1$ 430 is magnetically couplable to the first and second LLC power converters 401, 441.

In the system 400, in one embodiment, the resonant inductors 433, 446 are matched inductors. In one embodiment, a matched inductor is when the resonant inductors 433, 446 are configured to have a variation of inductance of less than 2% of each other. In further embodiments, the resonant inductors 433, 446 can be adjusted to further allow for a resonant matching between the first LLC power converter 401 and the second LLC power converter 441.

In one embodiment, a manufacturer of the resonant inductors 433, 446 inserts these into the component 431. In some embodiments, the inductors 433, 446 are manufactured from a common batch of manufactured items, thereby more likely to have a matched inductance value. In another embodiment, the manufacture of the component 431 adjusts a value of the resonant inductor 433 to ensure that they are within a tolerance of each other, such as 2%. In the system 400, the component 431 is inserted into the system 400, thereby helping to ensure a match between the inductors 433 and 446, and thereby further helping to ensure a match of the resonant frequencies between the first LLC power converter 401 and the second LLC power converter 441. In another embodiment, the manufacturer of the system 400 further adjusts at least one of the resonant inductors 433, 446 to help match a resonance between the LLC power converter 401 and the LLC power converter 441.

In other embodiments, having a match between the first and second inductors 433 and 446 can be advantageous even if the system 400 is operating outside of normal operating parameters. For example, if the load 430 draws too high of a current to be sustainable, both the LLC power converters 401, 441 would operate in a non-linear region. However, having substantially matched resonant inductors 433, 446 helps ensure that both of the LLC power converters 401, 441 operate non-linearly in a similar fashion (i.e., output characteristics, etc.), which can help avoid further failures to an interleaved LLC power converter system.

Figure 5:
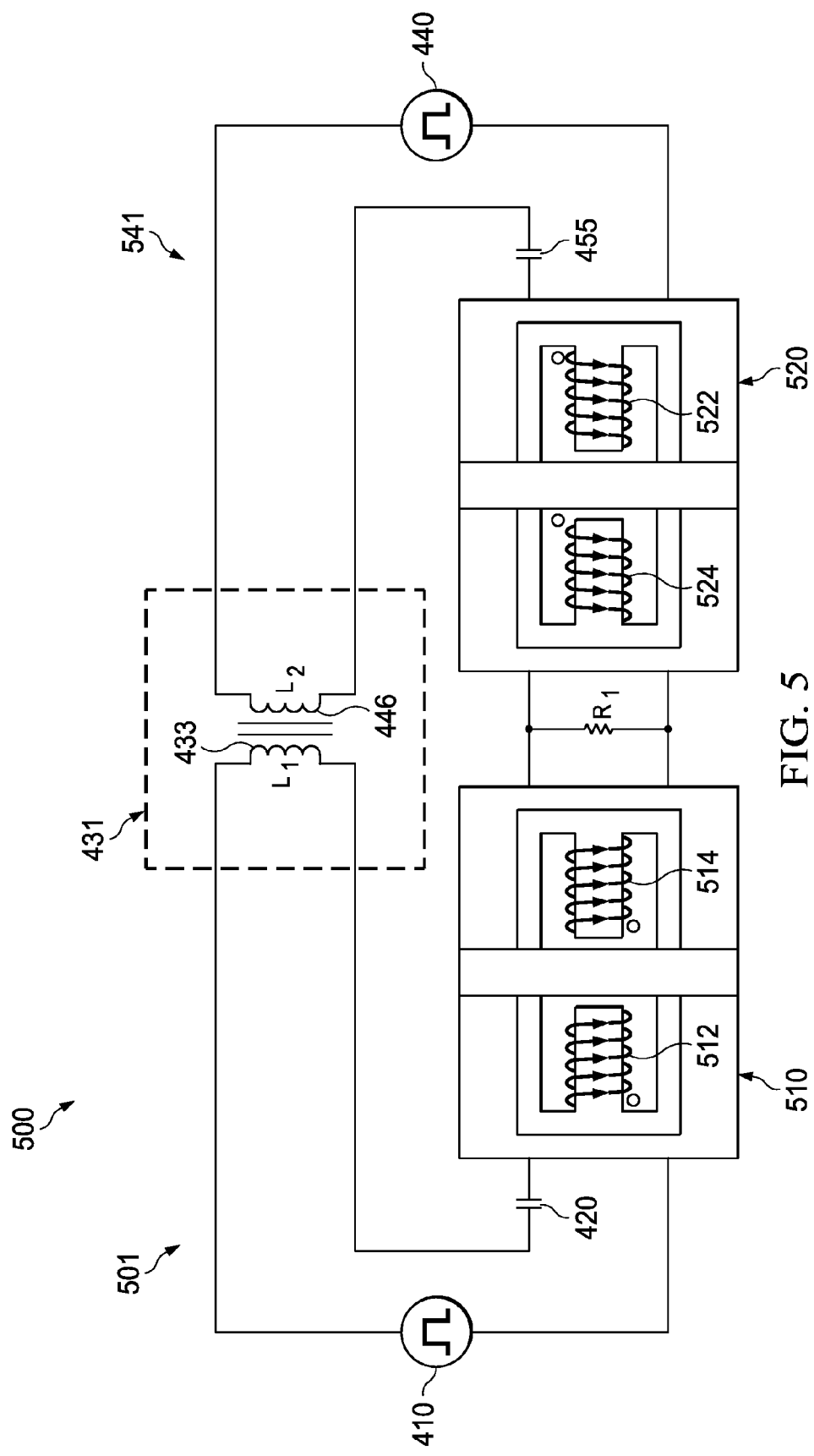
FIG. 5 is a block diagram of one embodiment of a system of two interleaved LLC power converters including a matched pair of resonant inductors and two transformers with opposing windings constructed according to the principles of the invention.

FIG. 5 is a block diagram of an embodiment of a system 500 of two interleaved first and second LLC power converters 501, 541 including the matched pair of resonant inductors 433, 446 of an integral component 431 and a first and a second transformer 510, 520 with opposing windings, i.e., in reverse directions, constructed according to the principles of the invention. For more information, please see U.S. Pat. No. 7,271,695 to Wadlington, et al., ("Wadlington") entitled "Electromagnetic Apparatus and Method for Making a Multi-Phase High Frequency Electromagnetic Apparatus", incorporated herein by reference in its entirety. Employment of the transformers 510, 520, such as found in Wadlington, generally allows a greater control of magnetic resonance and inductive resonance parameters in a circuit, thereby also allowing for a more effective interleaving of LLC power converters 501, 541. Employment of such electromagnetic apparatuses also provides the integral component 431 with the resonant inductors 433, 446, integrated thereon and galvanically isolated from each other via a bar-shaped core portion and air gaps. First and second transformers 510, 520, provide an example of the configuration of one embodiment of the integral component 431 wherein the resonant inductors 433, 446, can be integral on a common core and galvanically isolated.

The first transformer 510 has a first winding 512 opposing a second winding 514. The second transformer 520 has a first winding 522 opposing a second winding 524. In one embodiment, an inductance of the first transformer is within 2% of the second transformer due at least in part to a calibration of the windings of the first and second transformers.

Figure 6:
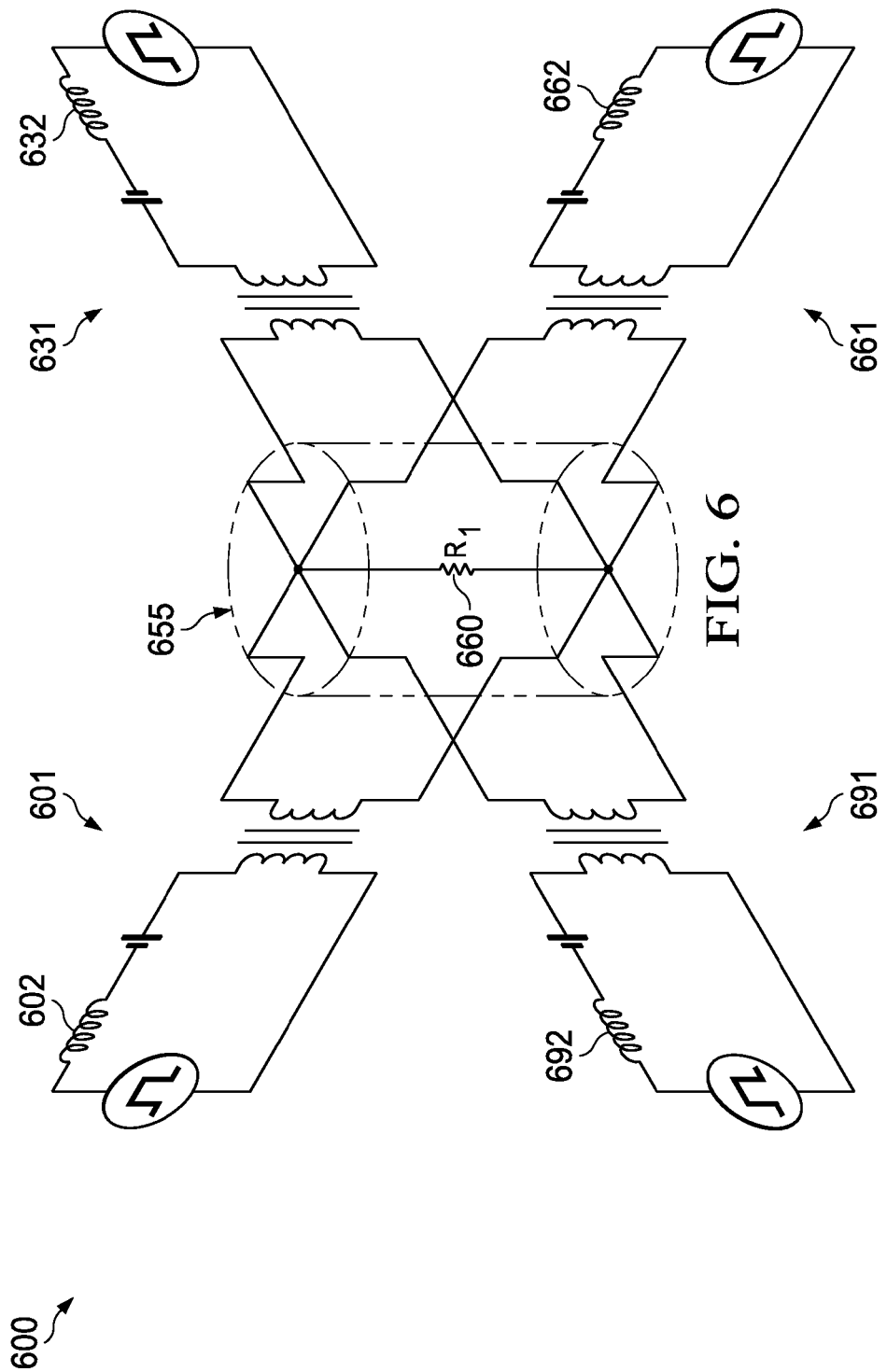
FIG. 6 is a block diagram of one embodiment of a system of greater than two interleaved LLC power converters constructed according to the principles of the invention.

FIG. 6 is a block diagram of one embodiment of a system 600 of more than two interleaved LLC power converters constructed according to the principles of the invention. A first LLC power converter 601, a second LLC power converter 631, a third LLC power converter 661, and a fourth LLC power converter 691 are all interleaved and magnetically couplable to a network 655 that includes a coupled common load 660. The resonant inductors 602, 632, 662, and 692 are all substantially matched. In one embodiment, the resonant inductances have a variation of 2.0% with one another. This allows an interleaving of the LLC power converters 601, 631, 661, and 691, as this helps ensure that the resonance frequencies of the LLC power converters are substantially matched, thereby helping to lessen a current conduction variation for each LLC power converter 602, 632, 662, and 692. Although not illustrated, the system 600 can further employ transformers having opposing windings, such as the transformers 510, 520 of FIG. 5.

Figure 7:
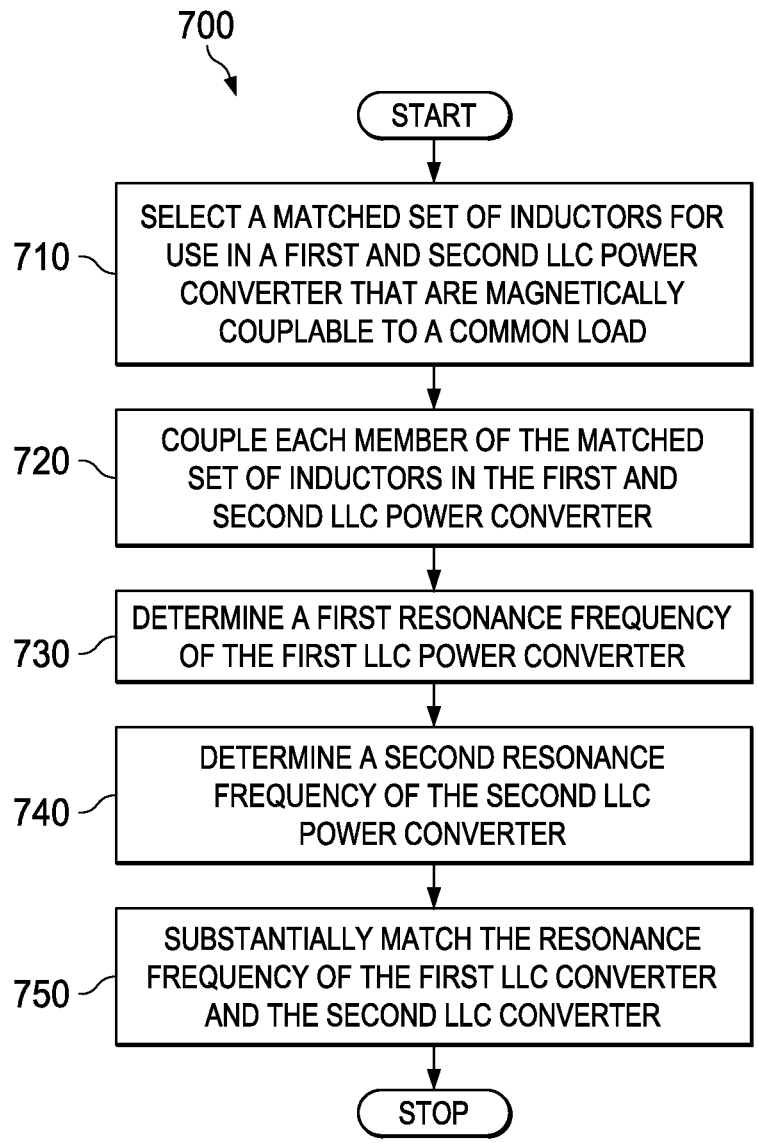
FIG. 7 illustrates a flow diagram of one embodiment of a method of manufacture of interleaved LLC power converters constructed according to the principles of the invention.

FIG. 7 illustrates a method 700 for manufacturing a first and a second power converter, such as found in the systems 200, 400, 500, and 600. In a step 710, a matched set of resonant inductors is selected for use in a first and second LLC power converter that are magnetically couplable to a common load. In a step 720, each member of the matched set of the inductors is coupled into the first and second LLC power converter. In a step 730, a first resonance frequency of the first LLC power converter is determined. In a step 740, a second resonance frequency of the second LLC power converter is determined. In a step 750, the resonance frequency of the first LLC power converter and the second LLC power converter are substantially matched.

In another embodiment of the method 700, the substantially matched inductors have an inductance value that is within 2% of each other. In further embodiments of the method 700, an inductance of at least one inductor of the first and the LLC power converters is adjusted to substantially match the resonant frequency of the first and second LLC power converters. The adjusting can further include adjusting the at least one inductor if the resonant frequency of the first LLC power converter is greater than 2% variation from the resonant frequency of the second LLC power converter.

In a further embodiment of method 700, a first transformer is coupled to the first LLC power converter, a second transformer is coupled to the second LLC power converter, and the common load is coupled between the first transformer and the second transformer. A primary winding of a first transformer is wound in an opposite direction of a secondary winding of the first transformer. The first transformer is coupled to the first LLC power converter. A primary winding of a second transformer is wound in an opposite direction of a secondary winding of the second transformer. The second transformer is part of the second LLC power converter. In one embodiment, adjusting of the inductance occurs due to a mismatch of an inductance of the first transformer and an inductance of the second transformer.

In another embodiment of the method 700, first and second resonant inductors are manufactured as part of a common batch. In another embodiment, the first resonant inductor and the second resonant inductor are integral within a common component. In another embodiment of the method 700, the step 720, of coupling each member of the matched set of inductors into the first and second LLC power converters, respectively, further includes coupling the integral component into both the first and second LLC power converters.

In another embodiment of the method 700, the coupled first and second LLC power converters are coupled in parallel to the common load. In yet another embodiment of the method 700, the step of matching substantially a resonant frequency of the first and second LLC power converters arises as a consequence of the step of coupling each member of the matched set of inductors into the first and second LLC power converters, respectively. In yet another embodiment, the matched set of inductors is selected for a plurality of up to a count of "N" LLC power converters, wherein the count of the plurality of LLC power converters is derived from: a) a maximum output ripple current requirement of an interleaving of the LLC power converters; and b) a volume available in a given design of the interleaving of the LLC power converters.

Those skilled in the art to which the invention relates will appreciate that other and further additions, deletions, substitutions and modifications may be made to the described embodiments without departing from the scope of the invention.

What is claimed is:

1. A system including a first inductor-inductor-capacitor ("LLC") power converter and a second LLC power converter, comprising:
    a first LLC voltage source of said first LLC power converter;
    a second LLC voltage source of said second LLC power converter;
    a first resonant inductor, a first magnetic inductor, and a first resonant capacitor of said first LLC power converter coupled to said first LLC voltage source;
    a second resonant inductor, a second magnetic inductor, and a second resonant capacitor of said second LLC power converter coupled to said second LLC voltage source, wherein said second resonant inductor and said first resonant inductor are integral on a common core, galvanically isolated from each other and have matched inductances, wherein said common core includes a bar-shaped core portion and air gaps between whereon said first resonant inductor is positioned and said second resonant inductor is positioned on said common core;
    wherein said first LLC power converter and said second LLC power converter are interleaved and both magnetically couplable to a common load.

2. The system of claim 1, wherein a resonant frequency of said first LLC power converter substantially matches a resonant frequency of said second LLC power converter.

3. The system of claim 1, wherein said first and said second resonant inductors are matched within a tolerance of 2% of a difference of inductance between said first resonant inductor and said second resonant inductor.

4. The system of claim 2, wherein said substantial match of said resonant frequency of said first LLC power converter and said resonant frequency of said second LLC power converter is defined as a variation of 2% or less of a resonant frequency between said first LLC power converter and said second LLC power converter.

5. The system of claim 1, wherein said first and second magnetic inductors are each a primary winding of a first and a second transformer, respectively.

6. The system of claim 5, wherein a direction of a primary winding of said first transformer is in an opposite direction of a secondary winding of said first transformer.

7. The system of claim 6, wherein: a direction of a primary winding of said second transformer is in an opposite direction of a secondary winding of said second transformer; and
    an inductance of said first transformer is within 2% of said second transformer due at least in part to a calibration of said primary windings of said first and second transformers.

8. The system of claim 1, further comprising an interleaved third LLC power converter magnetically coupleable to said common load, wherein an inductance of a third resonant inductor is substantially matched to said first resonant inductor within a tolerance of 2% of a variation of inductance.

9. A system including a first inductor-inductor-capacitor ("LLC") power converter and a second LLC power converter, comprising:
- a first LLC voltage source of said first LLC power converter;
- a second LLC voltage source of said second LLC power converter;
- a first magnetic inductor and a first resonant capacitor of said first LLC power converter coupled to said first LLC voltage source;
- a second magnetic inductor and a second resonant capacitor of said second LLC power converter coupled to said second LLC voltage source;
- a component comprising a common core, a first resonant inductor and a second resonant inductor, wherein said first resonant inductor and said second resonant inductor are manufactured on said common core and separated thereon by air gaps wherein said first and second resonant inductors have matched inductances,
- wherein said first resonant inductor is coupled to said first LLC voltage source,
- wherein said second resonant inductor is coupled to said second LLC voltage source, and
- wherein said first LLC power converter and said second LLC power converter are interleaved.

10. The system of claim 9, wherein said first and second magnetic inductors are each a primary winding of a first and a second transformer, respectively.

11. The system of claim 9 wherein a resonant frequency of said first LLC power converter matches a resonant frequency of said second LLC power converter.

12. The system of claim 9, wherein said component is manufactured with said first and second resonant inductors integrated therewith before said component is coupled to said first and second LLC power converters.

13. The system of claim 12, wherein said first and second resonant inductors are selected by a manufacturer as matched within a 2% inductance tolerance of each other.

14. The system of claim 9, wherein a resonance between said first LLC power converter and said second LLC power converter is within 2%.

15. A method of manufacturing a first and a second inductor-inductor-capacitor ("LLC") power converter, comprising:
- selecting a common component having a matched set of resonant inductors on a common core for use in a first and a second LLC power converter, each LLC power converter being interleaved, magnetically coupleable to a common load and having a different voltage source, wherein said common core includes air gaps and said matched set of resonant inductors are galvanically isolated from each other on said common core via said air gaps, wherein said matched set of resonant inductors are galvanically isolated from each other on said common core;
- coupling each member of said matched set of inductors into said first and second LLC power converters, respectively;
- determining a first resonance frequency of said first LLC power converter;
- determining a second resonance frequency of said second LLC power converter; and
- matching a resonant frequency of said first and second LLC power converters.

16. The method of claim 15, wherein said matched inductors have an inductance value of within 2% of each other.

17. The method of claim 15, further comprising:
- coupling a first transformer to said first LLC power converter; and
- coupling a second transformer to said second LLC power converter.

18. The method of claim 15, further comprising:
- winding a primary winding of a first transformer in an opposite direction of a secondary winding of said first transformer; and
- coupling said first transformer to said first LLC power converter.

19. The method of claim 18, further comprising:
- winding a primary winding of a second transformer in an opposite direction of a secondary winding of said second transformer; and
- coupling said second transformer to said second LLC power converter.

20. The method of claim 19, wherein said adjusting of said inductance occurs due to a mismatch of inductance of said first transformer and an inductance of said second transformer.

21. The method of claim 15, wherein said step of coupling each member of said matched set of inductors into said first and second LLC power converters, respectively, further comprises coupling said common component into both said first and second LLC power converters.

22. The method of claim 15, wherein a first transformer and a second transformer are coupled in parallel to a common load.

23. The method of claim 15, wherein said step of matching said resonant frequency of said first and second LLC power converters arises as a consequence of said step of coupling each member of said matched set of inductors into said first and second LLC power converter.

24. The method of claim 15, further comprising selecting said set of matching inductors for a plurality of LLC power converters, wherein a count of said plurality is derived from:
a) a maximum output ripple current requirement of an interleaving of said LLC power converters; and
b) a volume available in a given design of said interleaving of said LLC power converters.

25. The method of claim 15 wherein matching said resonance frequency includes adjusting said first resonant inductor to match a resonance frequency between said first LLC power converter and said second LLC power converter within 2%.

26. The method of claim 15 further comprising selecting said matched set of resonant inductors from a common batch of manufactured inductors.

27. The system of claim 9 wherein said first LLC power converter and said second LLC power converter are both magnetically coupled to a common load.

* * * * *

UNITED STATES PATENT AND TRADEMARK OFFICE
CERTIFICATE OF CORRECTION

| | | |
|---|---|---|
| PATENT NO. | : 8,564,976 B2 | Page 1 of 1 |
| APPLICATION NO. | : 12/273542 | |
| DATED | : October 22, 2013 | |
| INVENTOR(S) | : Reddy et al. | |

It is certified that error appears in the above-identified patent and that said Letters Patent is hereby corrected as shown below:

In the Claims:

In Column 9, Line 18, in Claim 9, delete "gaps" and insert -- gaps, --, therefor.

Signed and Sealed this
Eleventh Day of February, 2014

Michelle K. Lee
*Deputy Director of the United States Patent and Trademark Office*